United States Patent [19]
Terwilliger et al.

[11] 3,992,497
[45] Nov. 16, 1976

[54] PRESSURELESS SINTERING SILICON NITRIDE POWDERS

[75] Inventors: Gerald R. Terwilliger, Aspen, Colo.; Frederick F. Lange, Murrysville, Pa.

[73] Assignee: Westinghouse Electric Corporation, Pittsburgh, Pa.

[22] Filed: July 25, 1974

[21] Appl. No.: 491,917

Related U.S. Application Data

[63] Continuation-in-part of Ser. No. 361,754, May 18, 1973, abandoned.

[52] U.S. Cl. .............................. 264/56; 106/73.5; 264/66
[51] Int. Cl.² ................... C04B 33/32; C04B 35/58
[58] Field of Search .............. 264/65, 66, 125, 332, 264/56; 106/73.5

[56] References Cited
UNITED STATES PATENTS 3,035,235   5/1962   Nicholsen et al. ..................... 264/65
3,468,992   9/1969   Labatti ................................. 264/63

*Primary Examiner*—Donald J. Arnold
*Assistant Examiner*—John Parrish
*Attorney, Agent, or Firm*—R. T. Randig

[57] ABSTRACT

A method of producing a silicon nitride article by powder techniques, wherein silicon nitride powder is used as a starting material. The silicon nitride powder, mixed with a densification aid, is heated rapidly to the sintering/densification temperature (1500° to 1750° C) in the absence of pressure, held there a short, closely controlled time (5 to 30 minutes) and thereafter rapidly cooled. This provides a strong product with controlled dimensional tolerances.

3 Claims, No Drawings

PRESSURELESS SINTERING SILICON NITRIDE POWDERS

The invention herein described was made in the course of or under a contract with the Department of Navy and identified as N00019-71-C-0107.

CROSS REFERENCE TO RELATED APPLICATION

The present application is a continuation-in-part of application Ser. No. 361,754, filed May 18, 1973 now abandoned.

BACKGROUND OF THE INVENTION

This invention relates generally to a method of sintering and densification of silicon nitride powders, and more particularly to sintering and densification of such powders in the absence of applied pressure.

In the past, the principal methods of fabricating silicon nitrade by powder techniques have been reaction sintering of silicon powder in a nitrogen atmosphere and hot pressing of silicon nitride powders containing densification aids.

In the reaction sintering process silicon powders are shaped to the desired configuration and thereafter heated in the presence of nitrogen to form a silicon nitride shaped structure. (See for example N. L. Parr, R. Sands, P. L. Pratt, E. R. W. May, C. R. Shakespeare and D. S. Thompson, "Structural Aspects of Silicon Nitride" *Powder Met* [8] 152–63 (1961). This results in closely maintained dimensional tolerances of the articles, but a comparatively low strength (less than 30,000 psi flexural strength) product.

When silicon nitride powder has been used as a starting material, the prior art techniques have required both heat and applied pressure to form the final end product. (See for example United Kingdom Patent No. 1,092,637.) High strength (approximately 100,000 psi flexural strength) articles are obtained from this method but complex shapes are expensive and difficult to obtain, and dimensional tolerances can be obtained only by machining.

There have been many previous attempts to sinter silicon nitride powder into dense shapes by heating alone in the absence of applied pressure in an effort to obtain both high strength and inexpensive more easily produced complex shapes. (See for example D. J. Godfrey, "The use of Ceramics in High Temperature Engineering" *Metals and Materials* Oct. 1968, p.305) However, these attempts have proved to be unsuccessful in the past. Basically, when utilizing conventional sintering techniques with the silicon nitride powder, it was observed that the silicon nitride powder, even with densification aids added thereto, would decompose, and not densify to any appreciable extent. It appeared that at sintering/densification temperatures the silicon nitride apparently decomposed rapidly to a gaseous product preventing densification to any appreciable extent. (See for example H. D. Batha et al. "Kinetics and Mechanism of the Thermal Decomposition of $Si_3N_4$" *Journal of The American Ceramic Society*, Vol. 56, No. 7 Pages 365–369)

SUMMARY OF THE INVENTION

According to the present invention, a method of effectively sintering silicon nitride powder in the absence of pressure to effect densification of the shape is provided. This method includes rapidly heating the shaped powder article to the sintering/densification temperature range, (about 1500° to 1750° C) closely controlling the time at the sintering temperature, (about 5 minutes to about 30 minutes) and thereafter rapidly cooling the article to below the sintering/densification temperature.

DESCRIPTION OF THE PREFERRED EMBODIMENT

As indicated above, the prior art sintering and densifying techniques have proved to be ineffective in sintering and densifying particles formed of silicon nitride powder in the absence of applied pressure even by utilizing densification aids mixed with the powder. What would appear to happen when attempting to sinter according to prior art techniques to effect densification was that the silicon nitride powder tended to decompose and thus instead of effecting densification, there would actually be a loss of weight without a comparable decrease in volume, therefor a decrease in density occurs.

However, it has been discovered that is shaped articles of silicon nitride powders with densification aids added are heated rapidly to sintering/densification temperatures of from 1500° to 1750° C and maintained at temperature for a short controlled period of time, normally about 5 to 30 minutes, and are thereafter quickly cooled; then densification of silicon nitride powders in fact can be achieved with the improved flexural strength characteristics of articles sintered from the silicon nitride powders and also with good dimensional stability to be improved, thereby permitting complex shapes to be easily formed. More specifically it has been found that the heating rate is immaterial from a technical point of view until the temperature of about 1450° C is attained. Typical rates include a range between about 2C°/minute to about 12C°/minute. However, when heating from a temperature of about 1450° C to the sintering densification temperature and in no case to a temperature in excess of about 1750° C, the heating rate must be quite rapid. It has been found that a heating rate between about 15C°/minute and about 200C°/minute are effective if the balance of the processing parameters are within the confines disclosed herein. Of course, the precise rate within the critical temperature range must be selected so that the rate is not so rapid as to cause cracking to occur. Moreover, the mass must also be considered from the standpoint of thermal gradients. Thus the larger the mass, the heating rate within the critical temperature range should be nearer the lower end.

It is not completely understood why rapid heating and short closely controlled times at temperature followed by rapid cooling provides results unattainable by previous conventional sintering techniques. However, it is theorized that rapid heating and short retention time at the sintering/densification temperature followed by rapid cooling causes the sintering and densification processes to start and progress to a significant extent before the countervailing force of the decomposition of the silicon nitride powder progresses to a significant extent.

In the mechanism of sintering and densification the particles of the powder first form necks between adjacent particles which become the grain boundaries. Between the grain boundaries a liquid phase may exist. The densification proceeds by a reduction in number and size of the spaces or pores between the particles as they migrate into these grain boundaries through a transport mechanism which is followed by a partial collapse or moving together of the center points of the grains thus producing densification. However, in the case of silicon nitride powder, at the sintering/densification temperature there is a decomposition of the silicon nitride material to a gaseous product. This decomposition occurs inter alia in the regions of the pores or spaces resulting in a loss of solid material around these spaces or pores. Both the sintering/densification mechanism on one hand and the decomposition of the material on the other hand are time-temperature related. It is theorized that initially at the sintering temperatures between 1500° and 1750° C the sintering-/densification mechanism will proceed at a more rapid rate than the decomposition of the material, but as the time and/or temperature increases the amount of decomposition will increase until finally it occurs to a greater extent than the sintering/densification mechanism, thus overcoming the effects of the sintering/densification and actually preventing or reversing the amount to which densification has proceeded. Therefore, by rapid heating and close control of the time and temperature followed by rapid cooling, the initial more rapid progress of the sintering/densification mechanism is predominant, resulting in a densification of the material; and the rapid cooling thereafter to below this sintering/densification temperature prevents the subsequent decomposition of the densified product. (It should be noted that the term "sintering/densification temperature" as used herein is intended to define a temperature where necessary necking and pore transport and grain movement occurs to provide a densified body form from a body of individual particles of material pressed into a shape). It is from this reason that the time at the sintering/densification temperature must be closely controlled. If the time period is much less than 5 minutes, insufficient densification will occur whereas times in excess of about 30 minutes results in loss of material through excessive decomposition of the $Si_3N_4$.

It is also necessary to cool the densified mass at a high rate until the temperature has dropped to about 1450° C. Good results have been obtained where the cooling rate from the densification temperature to about 1450° C is within the range between about 15C°/minute to about 35C°/minute. Cooling to room temperature from 1450° C is usually accomplished at the intrinsic rate of the furnace resulting from power shut down and rates of about 2C°/minute to 12C°/minute are common.

Several tests on specimens were performed to determine the optimum conditions for performing this invention, wherein samples were heated to different temperatures and held for different times and then tested for various properties. To provide material for these tests 104.5 grams of silicon nitride powder (purchased from a commercial source) and 5.5 grams of MgO were milled for 72 hours using 100 millimeters of tertiary alcohol as a milling fluid and 1300 grams of ⅜ inch radius-ended tungsten carbide milling balls. The milled mixture was then dried on a hot plate. For each specimen tested a quantity of the prepared powder was dry pressed at 50,000 psi at ambient temperature in a rectangular or circular mold. For the tests, the specimens were placed in a coated graphite cylinder which was used as a susceptor in an RF heating unit or placed on a molybdenum support in a tungsten resistance furnace. In some cases the specimen was heated to about 600° C and was held at this temperature for about 60 minutes. This was to provide a stress relief and to drive off any volatile material. This 600° C temperature is well below the sintering/densification temperature and was used to prevent or minimize cracking or catastrophic failure of the sample during the subsequent rapid heating to the sintering/densification temperature.

The test specimens were then heated to the various temperatures indicated in the table below. The heating from the 600° C level to the sintering/densification temperature was accomplished in the time indicated, with the specimens being held at the indicated temperature for the time indicated for each specimen. Each of these specimens was then free cooled in the furnace; i.e. the furnace was turned off and the specimen allowed to cool to ambient temperature in an uncontrolled manner. The table indicates the initial densities and the final densities of each of the specimens.

TABLE

| Sample | Initial % Density | Final % Density | 600° C to max temp | max temp | time at max temp |
|---|---|---|---|---|---|
| 1B1 | 52.7 | 89.5 | 25 min. | 1650° C | 15 min. |
| 1B2 | 53.5 | 90.0 | " " | " | " " |
| K | 58 | 95.0 | 10 min. | 1700° C | 10 min. |
| H | " | 69.0 | 145 min. | " | 45 min. |
| I | " | 80.0 | 60 min. | 1660° C | 12 min. |
| D | " | 86.0 | 30 min. | " | 15 min. |
| L | " | 88.0 | 7 min. | " | " " |
| M | " | 83.0 | 5 min. | 1640° C | 17 min. |
| N | " | 83.0 | " " | " | " " |

As can be seen from the table above, substantial densification of the specimens can be attained by rapidly heating and closely controlling the time and temperature and thereafter rapidly cooling the specimens. The results shown in the table above indicate that a very rapid temperature excursion to a temperature of about 1700° with the specimens held at this temperature for a period of about ten minutes followed by a very rapid cooling seems to give the best densification results. However, the exact time-temperature relationship may vary somewhat with different conditions and different specimens, and thus a certain amount of experimentation may be required in each case to determine the optimum relationship between the sintering-densification temperature and the time at temperature and the optimum temperature and the rate of heating to temperature. However, broadly speaking, the sintering-/densification temperature should be between about 1500° and 1750° C and the times at temperature should be between 5 minutes and 30 minutes. The higher the temperature the shorter the time at temperature and, conversely, the lower the temperature, the longer the time. Also, the rate of heating from 1450° C to the sintering/densification temperature should be as rapid as possible without causing cracking. This will vary with many factors, but is principally related to the size of the specimens. Broadly speaking, the time will be between 10 minutes and 60 minutes, although in some cases more than one hour might be required. The exact reason for cracking due to too rapid a heating rate is not completely understood. However, it is believed to be related to out-gassing of the specimen.

Tests on the specimen 1B2 indicated a transverse flexural strength of 60,000 psi. This is substantially higher than strengths which can be obtained by reaction sintering. (The specimen 1B1 tested flexural strength of 30,000 psi; however, this specimen did have a crack extending through it and thus this physical configuration contributed to the lower strength). Other tests indicated good room temperature and high temperature flexural strength, substantially better than reaction sintered products and almost as good as products obtained by not pressing. Thus a substantial increase in strength can be obtained by sintering in the absence of pressure thereby enabling the specimen to maintain dimensional tolerances and allow complex shapes to be easily formed.

As indicated above, the silicon nitride powder was mixed with about 5% MgO. MgO is a well-known and conventional densification aid which is used in conventional sintering and densification practices wherein both heat and pressure are applied to silicon nitride powder. See for example United Kingdom Patent No. 1,092,637. Normally, anywhere between ½% and 10% of MgO powder is used, and of course other densification aids may also be used. While these densification aids are utilized in the present invention, their selection and quantity do not per se constitute a part of the present invention, the use of such aids and selection of the quantities being well-known in the art.

Silicon nitride powder was prepared in the manner set forth hereinbefore. This powder was formed into the shape of a disk having a diameter of about 3 inches and a thickness of about three-eighths inch. The preformed disk was thereafter subjected to heat in the absence of externally applied pressure. The disk was heated from 1420° to 1600° C in 15 minutes and held at temperature so that the total time at the sintering/densification temperature was 20 minutes. The power was then interrupted and the specimen cooled about 300C° in a period of 5 minutes. Tests revealed a density in excess of 89% of theoretical and a room temperature flexural strength in excess of 50 kpsi.

What is claimed is:

1. A method of sintering and densifying silicon nitride powder into a predetermined configuration, the steps comprising,
    a. providing silicon nitride powder with between about ½% and 10% by weight of MgO powder mixed therewith,
    b. forming said mixture to the desired shaped article,
    c. heating said shaped powder article in the absence of applied pressure to a temperature of about 600° C for a time period of about 60 minutes,
    d. increasing the temperature to the sintering/densification temperature within the range between about 1500° and 1750° C said heating to the sintering/densification temperature above 1450° C being at a rate between about 15C°/minute and about 200C°/minute,
    e. holding said article at the sintering/densification temperature for a time period between about 5 minutes and 30 minutes to cause densification to occur, and
    f. thereafter rapidly cooling the outside to a temperature below about 1450° C said cooling rate being between about 15C°/minute and about 35C°/minute.

2. The method of claim 1 wherein the sintering temperature is from 1500° C to 1700° C.

3. The method of claim 1 wherein the sintering temperature is about 1700° C, the time at temperature is about 10 minutes, and heating time between 600° C and 1700° C is about 10 minutes.

* * * * *